United States Patent
Iwasaki et al.

(10) Patent No.: US 12,128,482 B2
(45) Date of Patent: Oct. 29, 2024

(54) DIAMOND JOINED BODY AND METHOD FOR MANUFACTURING DIAMOND JOINED BODY

(71) Applicant: SUMITOMO ELECTRIC HARDMETAL CORP., Hyogo (JP)

(72) Inventors: Hirotsugu Iwasaki, Hyogo (JP); Jinning Li, Hyogo (JP); Tadashi Yamaguchi, Hyogo (JP); Shinichiro Yurugi, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 838 days.

(21) Appl. No.: 16/972,162

(22) PCT Filed: Mar. 27, 2019

(86) PCT No.: PCT/JP2019/013210
§ 371 (c)(1),
(2) Date: Dec. 4, 2020

(87) PCT Pub. No.: WO2019/244429
PCT Pub. Date: Dec. 26, 2019

(65) Prior Publication Data
US 2021/0237164 A1    Aug. 5, 2021

(30) Foreign Application Priority Data

Jun. 19, 2018 (JP) ................................. 2018-116201

(51) Int. Cl.
B23B 27/14    (2006.01)
B22F 3/12    (2006.01)
(Continued)

(52) U.S. Cl.
CPC ............... *B23B 27/14* (2013.01); *B22F 3/12* (2013.01); *B22F 7/008* (2013.01); *B22F 7/06* (2013.01);
(Continued)

(58) Field of Classification Search
None
See application file for complete search history.

(56) References Cited

U.S. PATENT DOCUMENTS

2009/0044415 A1\* 2/2009 Fujino .................... C22C 29/02
501/87
2011/0061944 A1    3/2011 Scott et al.
(Continued)

FOREIGN PATENT DOCUMENTS

CN    105945292 A    9/2016
JP    57-175776 A    10/1982
(Continued)

*Primary Examiner* — Seth Dumbris
(74) *Attorney, Agent, or Firm* — Renner, Otto, Boisselle & Sklar, LLP

(57) ABSTRACT

A diamond joined body is a diamond joined body including a hard substrate and a polycrystalline diamond layer arranged on the hard substrate, wherein an area ratio of carbon grains in a region of the hard substrate is less than 0.03%, the region being a region enclosed by an interface between the hard substrate and the polycrystalline diamond layer and an imaginary line x in a cross section parallel to a normal direction of the interface, the imaginary line x being parallel to the interface on the hard substrate side and having a distance of 500 μm from the interface.

5 Claims, 4 Drawing Sheets

(51) Int. Cl.
 *B22F 7/00* (2006.01)
 *B22F 7/06* (2006.01)
 *B22F 5/00* (2006.01)

(52) U.S. Cl.
 CPC ... *B22F 2005/001* (2013.01); *B22F 2302/406* (2013.01); *B23B 2226/315* (2013.01)

(56) References Cited

U.S. PATENT DOCUMENTS

| | | |
|---|---|---|
| 2011/0083907 A1 | 4/2011 | Israelsson et al. |
| 2015/0376744 A1* | 12/2015 | Konyashin ............ C22C 29/067 51/309 |
| 2016/0221080 A1* | 8/2016 | Higashi .................... B22F 7/06 |
| 2017/0266784 A1* | 9/2017 | Zhang ................... C04B 37/021 |
| 2017/0297172 A1* | 10/2017 | Zhang ..................... C01B 32/25 |
| 2017/0297960 A1 | 10/2017 | Zhang et al. |

FOREIGN PATENT DOCUMENTS

| | | |
|---|---|---|
| JP | S61-109628 A1 | 5/1986 |
| JP | 62-142704 A | 6/1987 |
| JP | 2010-208942 A | 9/2010 |
| JP | 2012-506508 A | 3/2012 |
| JP | 2016-513177 A | 5/2016 |
| KR | 100996838 B | 11/2010 |
| WO | 2010/046863 A1 | 4/2010 |
| WO | 2014/122306 A2 | 8/2014 |

* cited by examiner

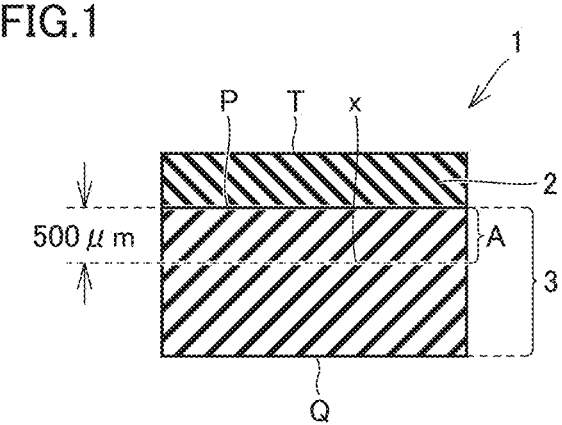
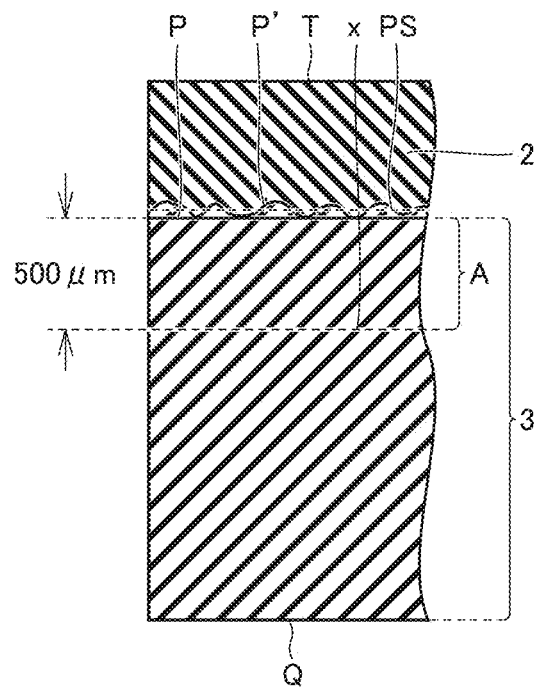

20 μm

20 μm

DIAMOND JOINED BODY AND METHOD FOR MANUFACTURING DIAMOND JOINED BODY

TECHNICAL FIELD

The present disclosure relates to a diamond joined body and a method for manufacturing the diamond joined body. The present application claims the priority to Japanese Patent Application No. 2018-116201 filed on Jun. 19, 2018, the entire contents of which are incorporated herein by reference.

BACKGROUND ART

Diamond has an extremely high hardness, and sintered polycrystalline diamond bodies manufactured from diamond grains as a raw material are used in a variety of tools such as cutting tools, wear-resistant tools, etc.

When a sintered polycrystalline diamond body is used in a tool, the sintered polycrystalline diamond body is generally used by joining a joined body obtained by joining the sintered polycrystalline diamond body to a hard substrate (hereinafter also denoted as a "diamond joined body") to a base metal serving as the base body of the tool.

Japanese Patent Laying-Open No. 2010-208942 (PTD 1) discloses a method for manufacturing a diamond joined body, wherein a mixed powder, which is a mixture of a diamond powder and a binder powder, is positioned on a hard substrate and then sintered under high temperature and high pressure.

CITATION LIST

Patent Literature

PTL 1: Japanese Patent Laying-Open No. 2010-208942
PTL 2: Japanese National Patent Publication No. 2016-513177

SUMMARY OF INVENTION

[1] A diamond joined body of the present disclosure is a diamond joined body including a hard substrate and a polycrystalline diamond layer arranged on the hard substrate, wherein
an area ratio of carbon grains in a region of the hard substrate is less than 0.03%, the region being a region enclosed by an interface between the hard substrate and the polycrystalline diamond layer and an imaginary line x in a cross section parallel to a normal direction of the interface, the imaginary line x being parallel to the interface on the hard substrate side and having a distance of 500 μm from the interface.

[2] A method for manufacturing the diamond joined body of the present disclosure is a method for manufacturing the diamond joined body as recited in [1] above, the method comprising:
preparing a hard substrate including tungsten carbide grains having a volume average grain size of not less than 0.1 μm and not more than 3 μm;
producing a compact by arranging a polycrystalline diamond layer raw material powder on the hard substrate; and
sintering the compact under pressure and temperature conditions in which diamond is stable, to thereby obtain a diamond joined body.

BRIEF DESCRIPTION OF DRAWINGS

FIG. 1 is a schematic cross-sectional view of a diamond joined body of the present disclosure.
FIG. 2 is a schematic cross-sectional view of a region near an interface between a hard substrate and a polycrystalline diamond layer of the diamond joined body of the present disclosure.

DETAILED DESCRIPTION

Figure 3:
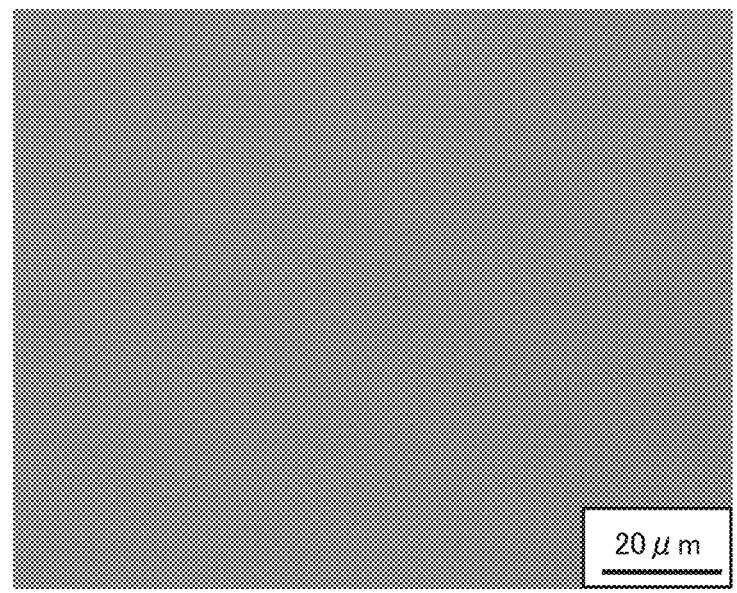
FIG. 3 is an optical micrograph of a measurement field of view of a diamond joined body of Sample 1 (Example).

Problem to be Solved by the Present Disclosure

A diamond joined body produced in accordance with a conventional manufacturing method has had such a tendency that carbon diffuses from diamond to the hard substrate side during sintering and is precipitated in the hard substrate. Since a region including the precipitated carbon and the neighborhood thereof has a low strength, the region tends to become the origin of a crack. Therefore, there is a demand for a technique of suppressing the precipitation of carbon in the hard substrate in the diamond joined body.

Japanese National Patent Publication No. 2016-513177 (PTL 2) discloses a polycrystalline superhard structure including: a substrate including a cemented carbide material that contains WC (tungsten carbide), Co (cobalt) and Re (rhenium) and does not substantially contain free carbon; and polycrystalline diamond bonded to the substrate. Although PTL 2 defines that the substrate does not substantially contain free carbon, Re is very expensive, and thus, it has been difficult to put the polycrystalline superhard structure to practical use.

The present disclosure has been made to solve the above-described problem and an object of the present disclosure is to provide a diamond joined body in which precipitation of carbon in a hard substrate is suppressed, and a method for manufacturing the diamond joined body.

Advantageous Effect of the Present Disclosure

In the diamond joined body of the present disclosure, precipitation of carbon in the hard substrate is suppressed. Therefore, a tool including the diamond joined body can have an improved chipping resistance to a breakage originating from the hard substrate during use of the tool, and a long tool life.

According to the method for manufacturing the diamond joined body of the present disclosure, there can be obtained a diamond joined body in which precipitation of carbon to the hard substrate side is suppressed.

Description of Embodiments

First, embodiments of the present disclosure are listed below.

(1) A diamond joined body of the present disclosure is a diamond joined body including a hard substrate and a polycrystalline diamond layer arranged on the hard substrate, wherein an area ratio of carbon grains in a region of the hard substrate is less than 0.03%, the region being a region enclosed by an interface between the hard substrate and the polycrystalline diamond layer and an imaginary line x in a cross section parallel to a normal direction of the interface, the imaginary line x being parallel to the interface on the hard substrate side and having a distance of 500 μm from the interface.

In the diamond joined body, precipitation of carbon in the hard substrate is suppressed. Therefore, a tool including the diamond joined body can have an improved chipping resistance to a breakage originating from the hard substrate during use of the tool, and a long tool life.

(2) Preferably, the hard substrate includes tungsten carbide grains having a volume average grain size of not less than 0.1 μm and not more than 3 μm. Thus, precipitation of carbon in the hard substrate is further suppressed.

(3) Preferably, the hard substrate includes not less than 70 mass % of the tungsten carbide grains and includes less than 100 mass % of the tungsten carbide grains. Thus, precipitation of carbon in the hard substrate is further suppressed.

(4) Preferably, the hard substrate includes not less than 0.01 mass % and not more than 2.0 mass % in total of at least one type of element selected from the group consisting of Ta, Cr and V. Thus, grain growth of tungsten grains forming the hard substrate can be suppressed. Therefore, a grain size of a raw material tungsten grains is likely to be maintained as a grain size of the tungsten grains in the hard substrate.

(5) Preferably, the hard substrate includes not less than 11 mass % and not more than 15 mass % of Co. Thus, a fracture toughness value of the hard substrate is improved, and a tool including the hard substrate is less likely to become cracked and can have a longer tool life.

(6) A method for manufacturing the diamond joined body of the present disclosure is a method for manufacturing the diamond joined body as recited in any one of (1) to (5) above, the method comprising:

preparing a hard substrate including tungsten carbide grains having a volume average grain size of not less than 0.1 μm and not more than 3 μm;

producing a compact by arranging a polycrystalline diamond layer raw material powder on the hard substrate; and sintering the compact under pressure and temperature conditions in which diamond is stable, to thereby obtain a diamond joined body.

According to the manufacturing method, there can be obtained a diamond joined body in which precipitation of carbon in the hard substrate is suppressed.

DETAILS OF EMBODIMENTS

Specific examples of the diamond joined body of the present disclosure and the method for manufacturing the same will be described below with reference to the figures. The present disclosure is not limited to these examples, and is defined by the terms of the claims and is intended to include any modifications within the scope and meaning equivalent to the terms of the claims.

First Embodiment: Diamond Joined Body

The diamond joined body of the present disclosure will be described with reference to FIGS. 1 and 2. FIG. 1 is a schematic cross-sectional view of the diamond joined body of the present disclosure. FIG. 2 is a schematic cross-sectional view of a region near an interface between a hard substrate and a polycrystalline diamond layer of the diamond joined body of the present disclosure.

As shown in FIG. 1, a diamond joined body 1 includes a hard substrate 3 and a polycrystalline diamond layer 2 arranged on hard substrate 3.

(Hard Substrate)

An area ratio of carbon grains in a region (hereinafter, also denoted as "region A") of hard substrate 3 is less than 0.03%, the region being a region enclosed by an interface P between hard substrate 3 and polycrystalline diamond layer 2 and an imaginary line x in a cross section parallel to a normal direction of interface P, imaginary line x being parallel to interface P on the hard substrate side and having a distance of 500 μm from interface P. A tool including the diamond joined body can have an improved chipping resistance and a long tool life. Although the reason for this is not exactly known, the present inventors make the following inference.

The carbon grains present in the hard substrate are precipitated carbon grains including at least one of grains composed of, for example, amorphous carbon, graphite or diamond. When the precipitated carbon grains are present in the hard substrate, a region including the precipitated carbon grains and the neighborhood thereof has a low strength, and thus, the region tends to become the origin of a crack. A tool produced using the diamond joined body in which the precipitated carbon grains are present is inferior in chipping resistance to a breakage originating from the hard substrate during use of the tool, and thus, the tool tends to have a short tool life.

In diamond joined body 1 according to the present embodiment, an area ratio of the precipitated carbon grains in region A in the hard substrate is less than 0.03%. That is, an amount of the precipitated carbon grains in the hard substrate is sufficiently small, and thus, the occurrence of a crack is suppressed.

The above-described area ratio of the precipitated carbon grains in the hard substrate is calculated in accordance with the following procedure of (a) to (d).

(a) Determination of Measurement Fields of View

Using a wire electric discharge processing machine, diamond joined body 1 is cut in a direction vertical to a surface of diamond joined body 1, i.e., a surface of polycrystalline diamond layer 2, to thereby obtain an exposed cross section. The exposed cross section is mirror-polished using diamond slurry having an average grain size of 3 μm. In the present embodiment, hard substrate 3 is produced such that a surface of hard substrate 3 is as smooth as possible, and polycrystalline diamond layer 2 is formed on hard substrate 3 such that a thickness of polycrystalline diamond layer 2 is uniform. Therefore, even when the surface of hard substrate 3 (interface with polycrystalline diamond layer 2) is somewhat uneven, the surface of polycrystalline diamond layer 2 becomes substantially parallel to interface P, and thus, there is no influence on the accuracy of measurement of the area ratio of the carbon grains described below.

In the cross section of diamond joined body 1, five measurement fields of view each having a rectangular shape with a width (direction parallel to interface P) of 120 μm×a height (direction vertical to interface P) of 100 μm are selected randomly in region A enclosed by interface P and imaginary line x, imaginary line x being parallel to interface P on the hard substrate 3 side and having a distance of 500 μm from above-described interface P.

As measured by the applicant, it has been confirmed that, for measurement in the same sample, while a location where a measurement field of view is selected is changed and calculation is performed for a plurality of times, measurement results of the area ratio of the carbon grains described below are obtained without substantial variations.

As shown in FIG. 2, a plane that is parallel to a reference plane PS, which is a plane having an average height of an actual interface P', and passes through a tip of a recessed portion of actual interface P' recessed most toward the hard substrate side is defined as interface P. In the above-described cross section, "area of hard substrate 3 protruding from reference plane PS to the polycrystalline diamond layer 2 side" is identical to "area of polycrystalline diamond layer 2 protruding from reference plane PS to the hard substrate 3 side".

In FIGS. 1 and 2, interface P is parallel to a main surface T on the surface side of polycrystalline diamond layer 2 and a main surface Q on the surface side of hard substrate 3. In this case, a normal line of interface P is identical to a normal line of main surface T on the surface side of polycrystalline diamond layer 2 and a normal line of main surface Q on the surface side of hard substrate 3.

(b) Capturing of Images of Measurement Fields of View

Using the following devices, an image of each measurement field of view is captured under the following conditions.

optical microscope: "AXIO Vert.A1" (product name) manufactured by Carl Zeiss AG lens: "EC Epiplan 100x/0.85 HD M27" (product name) manufactured by Carl Zeiss AG conditions for capturing images: time: 700 ms, intensity: 80%, gamma: 0.45

(c) Binarization Processing of Captured Images

Using the following image processing software, binarization processing is performed on the images captured in (b) above in accordance with the following procedure.

image processing software: Win Roof ver.7.4.5 process procedure:
1. correction of histogram average brightness (correction reference value: 128)
2. background subtraction (object size: 30 µm)
3. binarization with single threshold value (threshold value: 100)
4. brightness reversal (only a region of the carbon grains is extracted)

(d) Analysis of Images Subjected to Binarization Processing

An area ratio of pixels derived from a bright field of view (pixels derived from the carbon grains) to an area of the measurement field of view (hard substrate), i.e., the area ratio of the carbon grains in the measurement field of view is calculated from the images obtained in (c) above.

In the present embodiment, "an area ratio of carbon grains in a region of the hard substrate is less than 0.03%, the region being a region enclosed by an interface between the polycrystalline diamond layer and the hard substrate and an imaginary line x in a cross section parallel to a normal direction of a main surface of the hard substrate, the imaginary line x being parallel to the interface and having a distance of 500 µm from the interface" means that the area ratios of the carbon grains in the five measurement fields of view are all less than 0.03%.

The area ratio of the carbon grains is preferably not more than 0.02%, and more preferably not more than 0.01%. The smaller area ratio of the carbon grains is more preferable, and thus, a lower limit value is 0%. Therefore, the area ratio of the carbon grains can also be defined as not less than 0% and less than 0.03%.

So-called WC-based cemented carbide including tungsten carbide (hereinafter, also denoted as "WC") as a base material can be used as hard substrate 3. Such hard substrate 3 can have a high hardness and a high strength. In diamond joined body 1, a thickness (vertical direction in FIG. 1) of hard substrate 3 is not particularly limited, and can be, for example, not less than 1 mm and not more than 30 mm.

Hard substrate 3 preferably includes tungsten carbide grains (hereinafter, also denoted as "WC grains") having a volume average grain size of not less than 0.1 µm and not more than 3 µm. Generally, a fracture toughness of the WC-based cemented carbide tends to become lower as the grain size of the WC grains forming the WC-based cemented carbide becomes smaller (e.g., volume average grain size of not less than 0.1 µm and not more than 3 µm). When such WC-based cemented carbide is used as a tool material, a crack is likely to occur in the tool. Therefore, the WC-based cemented carbide including the WC grains having a grain size of not more than 3 µm has not been conventionally selected as a material of the hard substrate.

In contrast, a transverse-rupture-strength (TRS) of the WC-based cemented carbide becomes higher as the grain size of the WC grains forming the WC-based cemented carbide becomes smaller. Therefore, if there is no origin of the occurrence of a crack (fracture origin), the WC-based cemented carbide including the WC grains having a small grain size has properties of high transverse-rupture-strength and being hard-to-break.

In the hard substrate used in the present embodiment, the area ratio of the carbon grains that may become the origin of a crack is less than 0.03% and the amount of the carbon grains is sufficiently small, and thus, the origin of the occurrence of a crack is also sufficiently reduced. When the volume average grain size of the WC grains is not less than 0.1 µm and not more than 3 µm in the hard substrate, the transverse-rupture-strength of the hard substrate is high, and the origin of the occurrence of a crack is also sufficiently reduced. Therefore, a tool including the hard substrate is less likely to become cracked and can have a longer tool life.

Furthermore, as the grain size of the WC grains becomes smaller, the WC grains can take in a larger amount of carbon precipitated from the polycrystalline diamond layer to the hard substrate side during sintering. The precipitated carbon taken into the WC grains is present between the WC grains or in a binder phase as tungsten carbide or carbide of another element (such as V or Co) included in the hard substrate, and is not present in the form of the carbon grains.

In the present specification, "volume average grain size of the WC grains" refers to a median size (d50) in a volume-based grain size distribution (volume distribution), and refers to an average grain size targeted at all WC grains included in the hard substrate. In the present specification, "volume average grain size" may also be denoted simply as "grain size".

A grain size of each grain for calculating the grain size (volume average grain size) of the WC grains can be measured in accordance with the following method. First, the hard substrate is cut using the wire electric discharge processing machine, to thereby obtain a cut surface. The cut surface is mirror-polished, to thereby obtain a polished surface. In the polished surface, a measurement field of view of 100 µm×100 µm is arbitrarily set to include a region distant by 600 µm toward the hard substrate side from interface P between the hard substrate and the polycrystalline diamond layer. A reflected electron image of the measurement field of view is observed at 5000× magnification, using an electron microscope ("SU6600" manufactured by HITACHI). Next, in the reflected electron image, a diameter of a circle circumscribing the WC grains (i.e., circumscribed circle equivalent diameter) is measured and the diameter is defined as the grain size of the WC grains.

As measured by the applicant, it has been confirmed that, for measurement in the same sample, while a location where a measurement field of view is selected is changed and calculation is performed for a plurality of times, measurement results of the grain size of the WC grains are obtained without substantial variations, and thus, there is no arbitrariness even when a measurement field of view is set as desired.

A content of the WC grains in the hard substrate is preferably not less than 70 mass % and less than 100 mass %, more preferably not less than 70 mass % and not more than 90 mass %, and further preferably not less than 81 mass % and not more than 88 mass %.

The content (mass %) of the WC grains in the hard substrate is calculated in accordance with the following method. The hard substrate is cut using the wire electric discharge processing machine, to thereby obtain a cut surface. The cut surface is mirror-polished using diamond slurry having an average grain size of 3 μm, to thereby produce a sample for observation. A measurement field of view of 100 μm×100 μm is arbitrarily set on the polished surface of the sample for observation, and the measurement field of view is subjected to energy dispersive X-ray spectroscopy ("X-Max" manufactured by Oxford Instruments) to measure the content (mass %) of the WC grains.

As measured by the applicant, it has been confirmed that, for measurement in the same sample, while a location where a measurement field of view is selected is changed and calculation is performed for a plurality of times, measurement results of the content of the WC grains in the hard substrate are obtained without substantial variations, and thus, there is no arbitrariness even when a measurement field of view is set as desired.

In addition to the WC grains, hard substrate 3 includes preferably not less than 0.01 mass % and not more than 2.0 mass %, more preferably not less than 0.05 mass % and not more than 1 mass %, and further preferably not less than 0.1 mass % and not more than 0.5 mass %, in total of at least one type of element selected from the group consisting of Ta (tantalum), Cr (chromium) and V (vanadium).

Hard substrate 3 is produced by sintering the WC grains as a raw material (hereinafter, also denoted as "raw material WC grains"), together with iron-based metal. When at least one of Ta, Cr and V is present at the time of sintering of the raw material WC grains, grain growth of the raw material WC grains is suppressed. Therefore, in the obtained hard substrate, coarsening of the WC grains is suppressed and the grain size of the raw material WC grains is likely to be maintained.

Furthermore, Ta, Cr and V in the hard substrate bond with carbon that has moved from the polycrystalline diamond layer, to thereby generate carbide such as TaC (tantalum carbide), $Cr_3C_2$ (chromium carbide) or CV (vanadium carbide). Therefore, when at least one of Ta, Cr and V is present in the hard substrate, precipitation of carbon is suppressed.

In addition to WC, hard substrate 3 includes preferably not less than 11 mass % and not more than 20 mass %, more preferably not less than 11 mass % and not more than 17 mass %, and further preferably not less than 11 mass % and not more than 15 mass %, of Co (cobalt).

Generally, when a content of Co in the hard substrate is not less than 11 mass %, a thermal expansion coefficient of the cemented carbide forming the hard substrate tends to increase, and thus, a difference in thermal expansion coefficient between the hard substrate and the polycrystalline diamond layer tends to increase. The hard substrate and the polycrystalline diamond layer are sintered and joined in a state where a raw material powder of the polycrystalline diamond layer is arranged on the hard substrate. Therefore, when the difference in thermal expansion coefficient between the hard substrate and the polycrystalline diamond layer is large, a large residual stress occurs in the hard substrate and the polycrystalline diamond layer subjected to sintering.

Specifically, on the hard substrate side of the interface between the hard substrate and the polycrystalline diamond layer, a tensile stress occurs in the direction parallel to the interface, and on the polycrystalline diamond layer side of the interface, a compressive stress occurs in the direction parallel to the interface. Due to this, a crack originating from the hard substrate side of the interface is likely to occur, and a crack may occur after ultra-high-pressure sintering and/or a breakage originating from the hard substrate side of the interface may occur during use as a tool. Therefore, not less than 11 mass % has not been conventionally selected as the content of Co in the hard substrate.

The present inventors have newly found that, when the amount of the carbon grains is sufficiently reduced in the hard substrate near the interface between the hard substrate and the polycrystalline diamond layer, the hard substrate has an excellent fracture toughness value, even if the content of Co in the hard substrate is not less than 11 mass %. Although the reason for this is not exactly known, it is estimated that the amount of the carbon grains that becomes the origin of a crack is sufficiently reduced near the interface, and thus, the hard substrate used in the present embodiment has high resistance to a crack and the occurrence of a crack caused by an increase in residual stress with an increase in Co can be suppressed. A tool including the hard substrate is less likely to become cracked and can have a longer tool life.

In addition to Co, hard substrate 3 may include Fe (iron) and Ni (nickel). It is preferable that hard substrate 3 does not include Re. Since Re is expensive, hard substrate 3 that does not include Re has a cost advantage.

A content (mass %) of each of Ta, Cr, V, and Co in the hard substrate is calculated in accordance with the following method. The hard substrate is cut using the wire electric discharge processing machine, to thereby obtain a cut surface. The cut surface is mirror-polished using diamond slurry having an average grain size of 3 μm, to thereby produce a sample for observation. A measurement field of view of 100 μm×100 μm is arbitrarily set on the polished surface of the sample for observation, and the measurement field of view is subjected to energy dispersive X-ray spectroscopy ("X-Max" manufactured by Oxford Instruments) to measure a mass ratio of each element.

As measured by the applicant, it has been confirmed that, for measurement in the same sample, while a location where a measurement field of view is selected is changed and calculation is performed for a plurality of times, measurement results of the content of each of Ta, Cr, V, and Co in the hard substrate are obtained without substantial variations, and thus, there is no arbitrariness even when a measurement field of view is set as desired.

<Polycrystalline Diamond Layer>

A so-called polycrystalline diamond sintered body obtained by sintering diamond grains through the use of a sintering aid can be used as polycrystalline diamond layer 2. Polycrystalline diamond layer 2 can include unavoidable impurities, in addition to the diamond grains and the sintering aid.

A content of the diamond grains in polycrystalline diamond layer 2 is preferably not less than 70 volume % and not more than 98 volume %, and more preferably not less than 80 volume % and not more than 98 volume %. When the content of the diamond grains is less than 70 volume %, the hardness of polycrystalline diamond layer 2 may be insufficient. When the content of the diamond grains is more than 98 volume %, a content of the sintering aid decreases relatively, which makes bonding between the diamond grains weak or makes a degree of bonding nonuniform.

The content of the sintering aid in polycrystalline diamond layer 2 is preferably more than 2 volume % and less than 30 volume %. When the content of the sintering aid is not more than 2 volume %, the content of the sintering aid is low, which makes bonding between the diamond grains weak or makes a degree of bonding nonuniform. In contrast, when the content of the sintering aid is not less than 30 volume %, the hardness of polycrystalline diamond layer 2 may be insufficient.

In the present specification, the content of the diamond grains in polycrystalline diamond layer 2 is calculated in accordance with the following method. The polycrystalline diamond layer is cut using the wire electric discharge processing machine, to thereby obtain a cut surface. The cut surface is mirror-polished, to thereby obtain a polished surface. In the polished surface, a measurement field of view of 100 μm×100 μm is arbitrarily set to include a region distant by 200 μm toward the polycrystalline diamond layer side from interface P between the hard substrate and the polycrystalline diamond layer. A reflected electron image of the measurement field of view is observed at 5000× magnification, using the electron microscope. At this time, a diamond phase composed of the diamond grains is observed as a black region, and a binder phase composed of the sintering aid is observed as a gray region or a white region. Next, in the observed field-of-view image, the diamond phase region and the binder phase region are binarized by image processing, to thereby measure an occupancy area of the diamond phase region. Then, the occupancy area is substituted into the following equation (1), to thereby calculate a volume content of the diamond grains.

(volume content of diamond phase)=(occupancy area of diamond phase region)÷(area of polycrystalline diamond layer 2 in field-of-view image)× 100   (1)

As measured by the applicant, it has been confirmed that, for measurement in the same sample, while a location where a measurement field of view is selected is changed and calculation is performed for a plurality of times, measurement results of the content of the diamond grains in the polycrystalline diamond layer are obtained without substantial variations, and thus, there is no arbitrariness even when a measurement field of view is set as desired.

The thickness (vertical direction in FIG. 1) of polycrystalline diamond layer 2 is not particularly limited, and can be, for example, not less than 0.1 mm and not more than 5 mm.

(Diamond Grains)

The diamond grains preferably have a volume average grain size of not less than 0.1 μm and not more than 50 μm. When the volume average grain size of the diamond grains is more than 50 μm, a defect caused by cleavage of the diamond grains themselves is likely to occur. When a defect caused by cleavage occurs in the diamond phase, chipping is likely to occur in polycrystalline diamond layer 2. In addition, the grains having a volume average grain size of less than 0.1 μm are difficult to manufacture and handling thereof is also complicated. The volume average grain size of the diamond grains is more preferably not less than 0.1 μm and not more than 30 μm, and further preferably not less than 0.1 μm and not more than 5 μm.

In the present specification, "volume average grain size of the diamond grains" refers to a median size (d50) in a volume-based grain size distribution (volume distribution), and refers to an average grain size targeted at all diamond grains included in the polycrystalline diamond layer.

A grain size of each grain for calculating the grain size (volume average grain size) of the diamond grains can be measured in accordance with the following method. First, a cross section of polycrystalline diamond layer 2 is mirror-polished, to thereby obtain a polished surface. In the polished surface, a measurement field of view of 100 μm×100 μm is arbitrarily set to include a region distant by 200 μm toward the polycrystalline diamond layer side from interface P between the hard substrate and the polycrystalline diamond layer. A reflected electron image of the measurement field of view is observed at 5000× magnification, using the electron microscope. Next, in the reflected electron image, a diameter of a circle circumscribing the grains forming the diamond phase (i.e., circumscribed circle equivalent diameter) is measured and the diameter is defined as the grain size of the diamond grains.

As measured by the applicant, it has been confirmed that, for measurement in the same sample, while a location where a measurement field of view is selected is changed and calculation is performed for a plurality of times, measurement results of the grain size of the diamond grains are obtained without substantial variations, and thus, there is no arbitrariness even when a measurement field of view is set as desired.

In polycrystalline diamond layer 2, the diamond grains may be present individually, or may be present in a state where adjacent grains are bonded, i.e., in a state where neck growth is formed. However, in order to obtain polycrystalline diamond layer 2 having a higher strength, it is preferable that 90 volume % or more of the diamond grains forming the diamond phase are present in a state where neck growth is formed. Whether the diamond grains are present individually or in a state where neck growth is formed, and a volume % thereof can be controlled depending on a type and an amount of addition of the sintering aid described below.

(Sintering Aid)

Examples of the sintering aid can include known sintering aids used as sintering aids of diamond grains. Examples can include iron group metal such as cobalt (Co), iron (Fe) and nickel (Ni), titanium (Ti), zirconium (Zr), hafnium (Hf), vanadium (V), niobium (Nb), tantalum (Ta), chromium (Cr), molybdenum (Mo), tungsten (W), and manganese (Mn). Among these, Co is suitably used as the sintering aid of the diamond grains, because of its high rate of dissolution precipitation reaction of the diamond grains that drives neck growth formation of the diamond grains.

A content of Co in polycrystalline diamond layer 2 is preferably not less than 2 volume % and not more than 30 volume %. When the content of Co in polycrystalline diamond layer 2 is less than 2 volume %, bonding between the diamond grains tends to be weak or a degree of bonding tends to be nonuniform. In contrast, when the content of Co in polycrystalline diamond layer 2 is more than 30 volume %, the wear resistance and the strength such as chipping resistance and impact resistance of polycrystalline diamond layer 2 decrease. When the sintering aid includes one or more of the above-described elements other than Co, contents of the elements other than Co in a binder in polycrystalline diamond layer 2 are preferably not less than 0.1 volume % and not more than 80 volume %.

When the sintering aid is composed of only Co, the content of Co in polycrystalline diamond layer 2 can be calculated in accordance with the following method. The polycrystalline diamond layer is cut using the wire electric discharge processing machine, to thereby obtain a cut surface. The cut surface is mirror-polished, to thereby obtain a polished surface. In the polished surface, a measurement field of view of 100 μm×100 μm is arbitrarily set to include a region distant by 200 μm toward the polycrystalline diamond layer side from interface P between the hard substrate and the polycrystalline diamond layer. A reflected electron image of the measurement field of view is observed at 5000× magnification, using the electron microscope. At this time, the diamond phase composed of the diamond grains is observed as a black region, and the binder phase composed of the sintering aid is observed as a gray region or a white region. Next, in the observed field-of-view image, the diamond phase region and the binder phase region are binarized by image processing, to thereby measure an occupancy area of the binder phase region. Then, the occupancy area is substituted into the following equation (2), to thereby calculate a volume content of Co.

(volume content of Co)=(occupancy area of binder phase region)÷(area of polycrystalline diamond phase in field-of-view image)×100   (2)

As measured by the applicant, it has been confirmed that, for measurement in the same sample, while a location where a measurement field of view is selected is changed and calculation is performed for a plurality of times, measurement results of the content of Co in the polycrystalline diamond layer are obtained without substantial variations, and thus, there is no arbitrariness even when a measurement field of view is set as desired.

When the sintering aid includes the other elements in addition to Co, the content (mass %) of each of Co and the other elements can be calculated by ICP analysis.

Polycrystalline diamond layer 2 may include a cobalt-rich layer having a prescribed thickness from the interface side with hard substrate 3 and showing a high content (volume %) of cobalt. When polycrystalline diamond layer 2 includes the cobalt-rich layer, the residual stress caused by the difference in thermal expansion coefficient between polycrystalline diamond layer 2 and hard substrate 3 can be reduced.

(Applications of Diamond Joined Body)

The diamond joined body according to the present embodiment can be used in, for example, a cutting tool such as a drill, an end mill, an indexable cutting insert for milling, an indexable cutting insert for turning, a metal saw, a gear cutting tool, a reamer, or a tap, a wear-resistant tool such as a dresser, a stylus, a nozzle, or a dice, a grinding tool such as a grindstone, a wire saw, a blade, or a bit, and a tool such as a tool for friction stir welding. A tool produced using the diamond joined body can have an improved chipping resistance and a long tool life.

Second Embodiment: Method for Manufacturing Diamond Joined Body

A method for manufacturing the diamond joined body of the present disclosure will be described. The method for manufacturing the diamond joined body according to the present embodiment is a method for manufacturing the diamond joined body according to the first embodiment, the method including: preparing a hard substrate including tungsten carbide grains having a volume average grain size of not less than 0.1 μm and not more than 3 μm (hereinafter, also denoted as "hard substrate preparation step"); producing a compact by arranging a polycrystalline diamond layer raw material powder on the hard substrate (hereinafter, also denoted as "compact production step"); and sintering the compact under pressure and temperature conditions in which diamond is stable, to thereby obtain a diamond joined body (hereinafter, also denoted as "sintering step").

(Hard Substrate Preparation Step)

A hard substrate including tungsten carbide grains having a volume average grain size of not less than 0.1 μm and not more than 3 μm is prepared.

(Compact Production Step)

A compact is produced by arranging a polycrystalline diamond layer raw material powder on the hard substrate.

The polycrystalline diamond layer raw material powder can be obtained by mixing diamond grains and a sintering aid using a ball mill or the like.

The details of the diamond grains used in this step is similar to the diamond grains described in detail in the first embodiment, and thus, description thereof will not be repeated. It is assumed that the shape, property, nature and performance of the diamond grains do not change before and after the sintering step in the present embodiment. A grain size of the diamond grains in the polycrystalline diamond layer raw material powder can be calculated based on a grain size distribution measured in accordance with a laser diffraction method.

The details of the sintering aid used in this step is similar to the sintering aid described in detail in the first embodiment, and thus, description thereof will not be repeated.

Examples of a method for arranging the polycrystalline diamond layer raw material powder on the hard substrate include a method for arranging a preliminarily sintered hard substrate in a mold made of a high heat-resistant material such as tantalum, and arranging a polycrystalline diamond layer raw material powder on the hard substrate in a layered manner with a prescribed thickness. A compact can thus be obtained.

As described above, in the compact production step described in detail, one layer is molded using the mixed powder obtained by mixing the diamond grains and the sintering aid using the ball mill or the like. However, the diamond grains and the sintering aid may be molded in different layers. When one layer is molded using the mixed powder, a sintered body having a degree of neck growth that is uniform all over the sintered body is obtained. In contrast, when the sintering aid and the diamond grains are molded in two different layers, a sintered body having a layer including the diamond grains at high density is obtained. Such a sintered body is excellent in strength and wear resistance.

(Sintering Step)

Next, the obtained compact is sintered under pressure and temperature conditions in which diamond is stable. The pressure and temperature conditions in which diamond is stable refers to the conditions that the pressure is not less than 5.0 GPa and not more than 8.0 GPa and the temperature is not less than 1300° C. and not more than 1900° C. The sintering time is not particularly limited, and is changed as appropriate depending on the size, thickness and the like of the compact. However, by sintering the compact for at least 5 minutes or longer, a sufficiently sintered diamond joined body can be obtained.

EXAMPLES

The present embodiment will be described more specifically with reference to examples. However, the present embodiment is not limited to these examples.

[Sample 1 and Sample 2]
<Production of Diamond Joined Body>
(Hard Substrate Preparation Step)

For Sample 1, a hard substrate including 88 mass % of WC grains having a volume average grain size of 0.3 μm was prepared. The hard substrate includes 0.4 mass % in total of Ta, Cr and V.

For Sample 2, a hard substrate including 92.2 mass % of WC grains having a volume average grain size of 5 μm was prepared. The hard substrate does not include Ta, Cr and V.

(Compact Production Step)

Diamond grains having a volume average grain size of 5 μm and Co grains were mixed to prepare a polycrystalline diamond layer raw material powder. A content of the diamond grains in the polycrystalline diamond layer raw material powder was 96 mass %, and a content of the Co grains was 4 mass %.

The hard substrate of each sample and the polycrystalline diamond layer raw material powder were arranged in this order in a mold made of tantalum, to thereby obtain a compact.

(Sintering Step)

Next, the mold that accommodates the compact was left to stand in a sintering furnace, and a pressure in the furnace was raised to 5 GPa and a temperature in the furnace was raised to 1500° C. Thereafter, this state was maintained for 10 minutes or longer to sinter the compact. A diamond joined body was thus manufactured.

<Evaluation>
(Measurement of Area Ratio of Precipitated Carbon)

As to the obtained diamond joined body, an area ratio of precipitated carbon grains in a region having a distance of 500 μm or shorter from an interface between the polycrystalline diamond layer in the hard substrate and the hard substrate was calculated. A specific calculation method is described in the first embodiment, and thus, description thereof will not be repeated. The results are shown in the column of "Area ratio of precipitated carbon" in Table 1.

(Calculation of Volume Average Grain Size of WC Grains in Hard Substrate)

For each sample, a volume average grain size of the WC grains in the hard substrate was calculated. A specific calculation method is described in the first embodiment, and thus, description thereof will not be repeated. The results are shown in the column of "Volume average grain size of WC grains" in Table 1.

(Measurement of Co Content in Hard Substrate)

A Co content (mass %) in the hard substrate was measured by analysis using energy dispersive X-ray spectroscopy. A specific measurement method is described in the first embodiment, and thus, description thereof will not be repeated. The results are shown in the column of "Co content (mass %)" in Table 1.

TABLE 1

| | Volume average grain size of WC grains (μm) | Co content (mass %) | Area ratio of precipitated carbon (%) |
|---|---|---|---|
| Sample 1 (Example) | 0.3 | 12.1 | 0 |
| Sample 2 (Comparative Example) | 5.0 | 7.8 | 0.49 |

(Shear Test)

Figure 7:
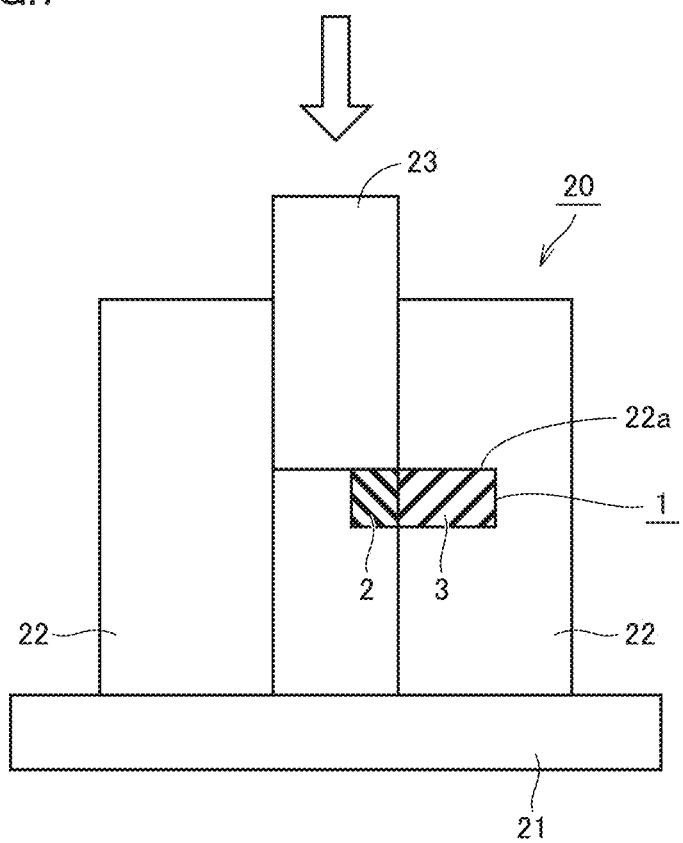
FIG. 7 is a schematic cross-sectional view of a shear tester used in a shear test.
Figure 8:
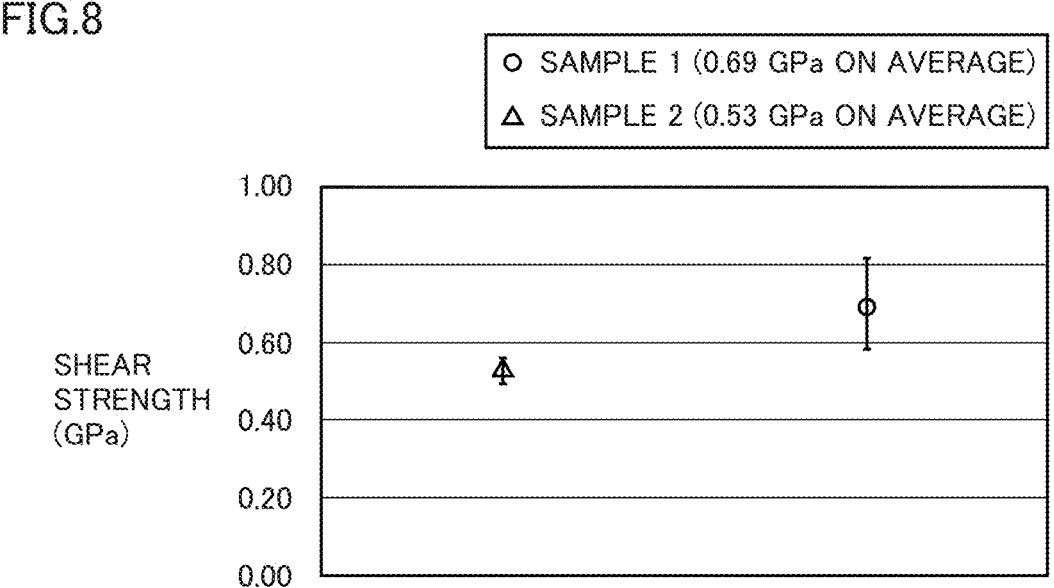
FIG. 8 is a graph showing results of the shear test.

A diamond joined body test piece having a prescribed size was cut from the diamond joined body of each sample. Then, using a shear tester 20 shown in FIG. 7, a shear strength of the diamond joined body test piece was measured. Specifically, for each diamond joined body test piece, shear tester 20 was fixed such that hard substrate 3 was located in a holding portion 22a and polycrystalline diamond layer 2 was reliably exposed from holding portion 22a. For each test piece, care was taken so that the equivalent region was located in holding portion 22a. Then, a head 23 was pressed against each test piece to apply a load, and a load at which each test piece was broken was defined as a shear strength of each diamond joined body. The shear test was performed four times on each sample. The higher shear strength indicates that a crack is less likely to occur and the chipping resistance is more excellent. The results are shown in FIG. 8.

(Evaluation Results)

In Sample 1, the area ratio of the precipitated carbon is 0%, and Sample 1 corresponds to Example. In Sample 2, the area ratio of the precipitated carbon is 0.49%, and Sample 2 corresponds to Comparative Example. It was confirmed that Sample 1 was higher in shear strength and more excellent in chipping resistance than Sample 2.

Figure 4:
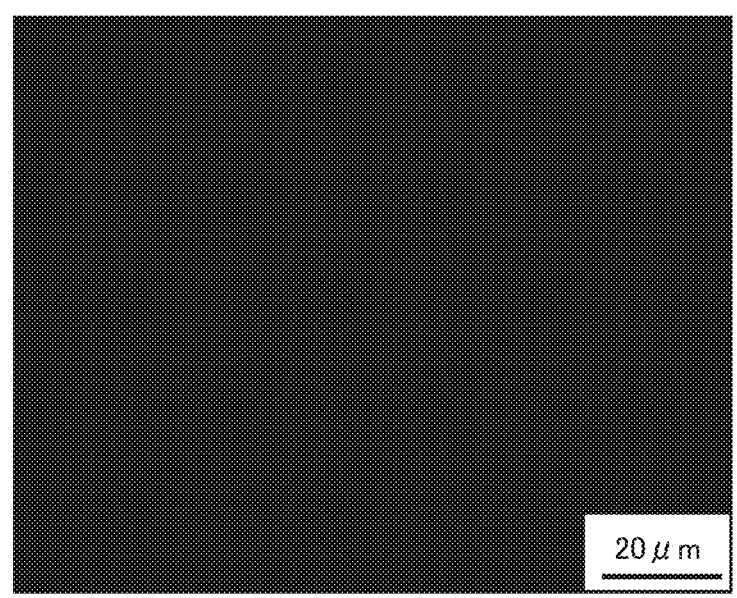
FIG. 4 is a binarized image of the optical micrograph shown in FIG. 3.

An optical micrograph of a measurement field of view of a cross section of the diamond joined body of Sample 1 (Example) is shown in FIG. 3. As shown in FIG. 3, the precipitated carbon was not seen in the region of the hard substrate in Sample 1. FIG. 4 is a binarized image of the optical micrograph shown in FIG. 3. In FIG. 4 as well, the precipitated carbon was not seen.

The diamond joined body test piece of Sample 1 subjected to the shear test was observed. Only the hard substrate had a crack, and the polycrystalline diamond layer did not have a crack. Therefore, it was confirmed that the diamond joined body of Sample 1 had an improved chipping resistance to a breakage originating from the hard substrate during use of the tool.

Figure 5:
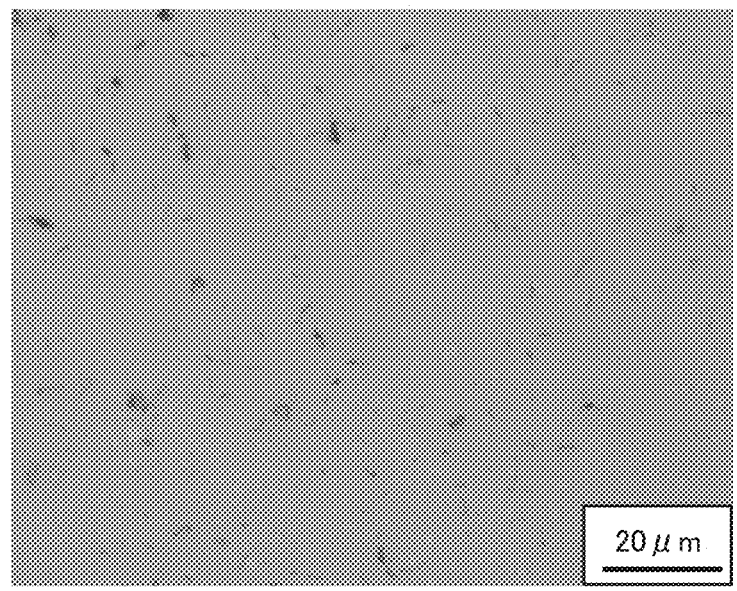
FIG. 5 is an optical micrograph of a measurement field of view of a diamond joined body of Sample 2 (Comparative Example).
Figure 6:
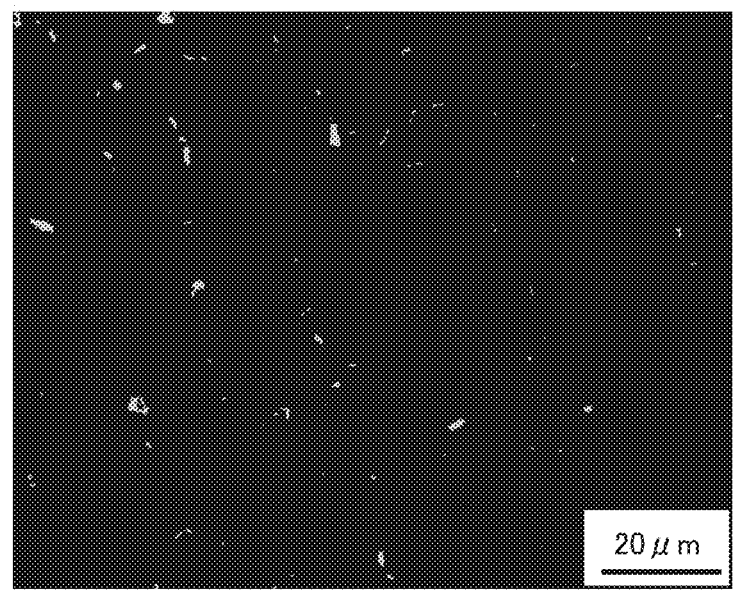
FIG. 6 is a binarized image of the optical micrograph shown in FIG. 5.

An optical micrograph of a measurement field of view of a cross section of the diamond joined body of Sample 2 (Comparative Example) is shown in FIG. 5. As shown in FIG. 5, the precipitated carbon was seen in the region of the hard substrate in Sample 2. FIG. 6 is a binarized image of the optical micrograph shown in FIG. 5. In FIG. 6 as well, the precipitated carbon was seen.

While the embodiments and the examples of the present invention have been described above, it is also originally intended to combine as appropriate and variously modify features in each embodiment and example described above.

It should be understood that the embodiments and examples disclosed herein are illustrative and non-restrictive in every respect. The scope of the present invention is defined by the terms of the claims, rather than the embodiments and examples above, and is intended to include any modifications within the scope and meaning equivalent to the terms of the claims.

REFERENCE SIGNS LIST

1 diamond joined body; 2 polycrystalline diamond layer; 3 hard substrate; 20 shear tester: 21 base: 22a holding portion: 23 head; x imaginary line; P interface; PS reference plane.

The invention claimed is:

1. A diamond joined body comprising a hard substrate and a polycrystalline diamond layer arranged on the hard substrate, wherein
   an area ratio of carbon grains in a region of the hard substrate is greater than 0% and less than 0.03%, the region being a region enclosed by an interface between the hard substrate and the polycrystalline diamond layer and an imaginary line x in a cross section parallel to a normal direction of the interface, the imaginary line x being parallel to the interface on the hard substrate side and having a distance of 500 μm from the interface,
   wherein the hard substrate does not include rhenium, and
   wherein the hard substrate includes tungsten carbide grains having a volume average grain size of not less than 0.1 μm and not more than 3 μm.

2. The diamond joined body according to claim 1, wherein the hard substrate includes not less than 70 mass % of the tungsten carbide grains and includes less than 100 mass % of the tungsten carbide grains.

3. The diamond joined body according to claim 1, wherein the hard substrate includes not less than 0.01 mass % and not more than 2.0 mass % in total of at least one type of element selected from the group consisting of Ta, Cr and V.

4. The diamond joined body according to claim 1, wherein the hard substrate includes not less than 11 mass % and not more than 20 mass % of Co.

5. A method for manufacturing the diamond joined body as recited in claim 1, the method comprising:
   preparing a hard substrate including tungsten carbide grains having a volume average grain size of not less than 0.1 μm and not more than 3 μm;
   producing a compact by arranging a polycrystalline diamond layer raw material powder on the hard substrate; and
   sintering the compact under pressure and temperature conditions in which diamond is stable, to thereby obtain a diamond joined body.

* * * * *